(12) United States Patent
Merten et al.

(10) Patent No.: US 10,939,743 B2
(45) Date of Patent: Mar. 9, 2021

(54) PORTABLE POWERED APPLIANCE SUPPORT STRAP

(71) Applicant: M Group, Inc., Manitowoc, WI (US)

(72) Inventors: David J. Merten, Manitowoc, WI (US); Jay Z. Muchin, Manitowoc, WI (US); Joshua J. Nelson, Phoenix, AZ (US); Jared Wilson Thorn, Chandler, AZ (US); Mariel Z. Pina, Chandler, AZ (US)

(73) Assignee: M Group, Inc., Manitowoc, WI (US)

( * ) Notice: Subject to any disclaimer, the term of this patent is extended or adjusted under 35 U.S.C. 154(b) by 0 days.

(21) Appl. No.: 16/276,565

(22) Filed: Feb. 14, 2019

(65) Prior Publication Data

US 2019/0246775 A1 Aug. 15, 2019

Related U.S. Application Data

(60) Provisional application No. 62/630,582, filed on Feb. 14, 2018.

(51) Int. Cl.
| | |
|---|---|
| *A45F 3/14* | (2006.01) |
| *A01D 34/90* | (2006.01) |
| *A01G 3/06* | (2006.01) |

(52) U.S. Cl.
CPC .............. *A45F 3/14* (2013.01); *A01D 34/902* (2013.01); *A01G 3/06* (2013.01); *A45F 2003/142* (2013.01); *A45F 2200/0575* (2013.01)

(58) Field of Classification Search
CPC ........ A45F 2003/142; A45F 2200/0575; A45F 3/14; A01D 34/90; A01D 34/902; A01D 34/905; A01D 34/416

USPC .......... 224/602–622, 257–258, 264
See application file for complete search history.

(56) References Cited

U.S. PATENT DOCUMENTS

| | | | |
|---|---|---|---|
| 4,219,117 A * | 8/1980 | Weaver | B65D 71/504 206/150 |
| D344,629 S | 3/1994 | Steffek et al. | |
| D480,946 S | 10/2003 | Estep, Jr. | |
| 7,083,585 B2 * | 8/2006 | Latham | A61F 5/028 602/19 |
| D618,359 S | 6/2010 | Einarsson | |
| D665,963 S | 8/2012 | Liljedahl | |
| D674,981 S * | 1/2013 | Liljedahl | D34/28 |
| D732,933 S | 6/2015 | Jansen | |
| D753,470 S | 4/2016 | Paladino | |
| 9,550,550 B1 | 1/2017 | Housman | |
| D811,859 S | 3/2018 | Orser | |
| D823,671 S | 7/2018 | Rothbaum et al. | |
| D829,128 S | 9/2018 | Webb | |
| D830,367 S | 10/2018 | Chang | |

(Continued)

OTHER PUBLICATIONS

Homedepot.com, last visited Jan. 21, 2017 (via the Wayback Machine Internet Archive) (Year: 2017).*

*Primary Examiner* — Scott T McNurlen
(74) *Attorney, Agent, or Firm* — Rathe Lindenbaum LLP

(57) ABSTRACT

An example powered appliance support strap may include a first portion to extend from a continuous loop of a shoulder strap, a second portion to extend from a powered appliance to be manually carried by a person wearing the shoulder strap and a stretcher extending between the first portion and the second portion. The stretcher does not undergo stretching until experiencing a stretch triggering load at least 1 kg and no greater than 7 kg.

15 Claims, 8 Drawing Sheets

(56) References Cited

U.S. PATENT DOCUMENTS

| | | |
|---|---|---|
| D830,495 S | 10/2018 | Covington |
| D831,356 S | 10/2018 | Ryan |
| 2005/0251967 A1 | 11/2005 | McNeill |
| 2005/0258205 A1* | 11/2005 | French .................... A45F 3/12 224/264 |
| 2006/0070165 A1* | 4/2006 | Nordt, III ............. A61F 5/0106 2/69 |
| 2012/0138322 A1* | 6/2012 | Neubauer ................ B26D 5/00 173/2 |
| 2016/0363838 A1* | 12/2016 | Nguyen ............... G03B 17/561 |

\* cited by examiner

PORTABLE POWERED APPLIANCE SUPPORT STRAP

CROSS-REFERENCE TO RELATED PATENT APPLICATIONS

The present application is a non-provisional patent application claiming priority under 35 USC 119 from U.S. provisional patent application 62/630,582 filed Feb. 14, 2018, the full disclosure of which is hereby incorporated by reference. The present application is related to U.S. design patent application Ser. No. 29614905 filed on Aug. 24, 2017 by Merten et al. and entitled POWERED APPLIANCES SUPPORT STRAP, the full disclosure of which is incorporated by reference.

BACKGROUND

Portable powered appliances are used for a variety of tasks. Portable powered appliances are powered appliances that operate under the power supplied by a battery or an internal combustion engine and which or portable in that they are physically carried by a person using the appliance. Examples of portable powered appliances include, but are not limited to, edgers, trimmers, tillers and the like. Such portable powered appliances are often supported at least in part using a shoulder strap worn over a person's shoulders and coupled to the portable powered appliance.

Figure 1:
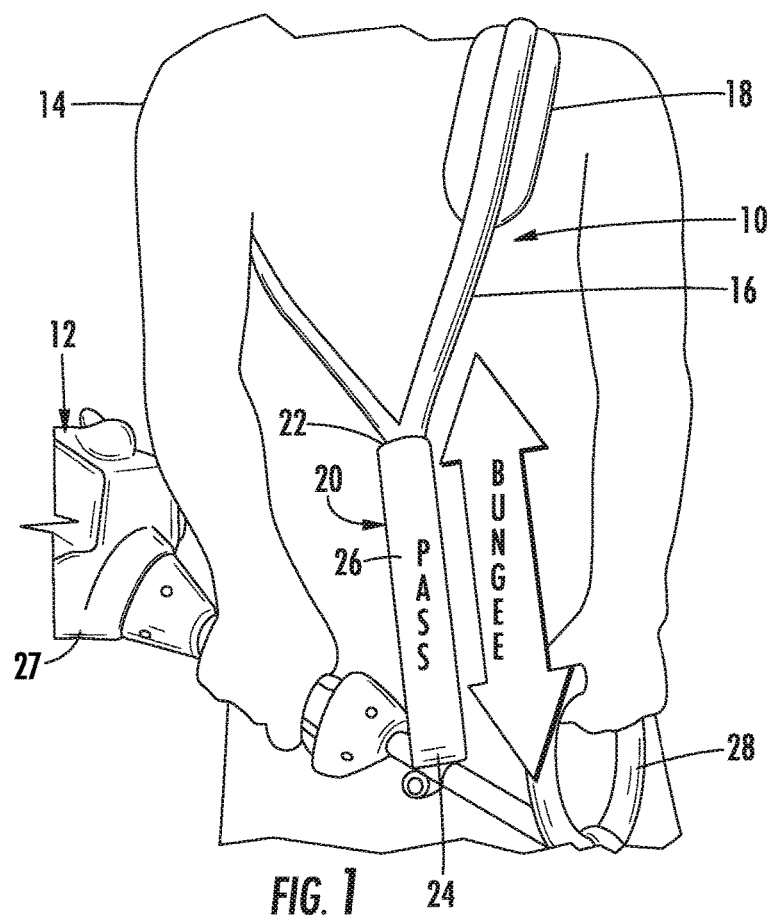
FIG. 1 is a front perspective view of an example powered appliance support system having an example powered appliance support strap (schematically illustrated) and worn by a person to assist in carrying an example powered appliance.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed is an example powered appliance support strap (PASS) configured to be operably coupled between the shoulder strap and the portable powered appliance, wherein the PASS is stretchable. The stretchability of the PASS facilitates repositioning of the PASS by the user during use of the PASS. The stretchability of the PASS absorbs weight of the portable powered appliance and relieves body tension. At the same time, the PASS stabilizes the powered appliance to facilitate enhanced control over the powered appliance.

In one implementation, the PASS is configured so as to not undergo stretching until experiencing a stretch triggering load of at least 4.5 kg (approximately 10 pounds) and no greater than 7 Kg (approximately 15.4 pounds). In another implementation, the PASS is configured so as to not undergo stretching until experiencing a stretch triggering load of at least 4.5 kg (approximately 10 pounds) and no greater than 5 kg (approximately 11 pounds). As a result, the PASS may better transfer the weight of the powered appliance to the shoulders of the person carrying the portable powered appliance in the absence of intentional stretching of the PASS. Moreover, the PASS is less likely to undergo inadvertent and/or excessive bouncing during use.

Disclosed herein is an example powered appliance support strap that may include a first portion to extend from a continuous loop of a shoulder strap, a second portion to extend from a powered appliance to be manually carried by a person wearing the shoulder strap and a stretcher extending between the first portion and the second portion. The stretcher does not undergo stretching until experiencing a stretch triggering load at least 1 kg and no greater than 7 kg, and in one implementation, no greater than 7 kg.

FIG. 1 schematically illustrates an example powered appliance support system 10 supporting an example powered appliance 12 from the shoulders of a user 14. System 10 comprises shoulder strap 16 and powered appliance support strap (PASS) 20 (schematically illustrated). As shown by FIG. 1, strap 16 is in the form of a continuous loop that wraps over one shoulder and beneath an opposite shoulder of user 14. In one implementation, strap 16 may have two ends which are releasably connected to one another. In one implementation, strap may have two ends which are releasably connected to one another via a buckle arrangement to provide strap 16 with an adjustable length. In one implementation, shoulder strap 16 may additionally comprise padding 18.

PASS 20 is operably coupled between shoulder strap 16 and appliance 12. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

PASS 20 comprise a first portion 22 that extends from the continuous loop of shoulder straps 16, a second portion 24 that extend from the powered appliance 12 and a stretcher 26 extending between the first portion 22 and the second portion 24. In one implementation, the first portion 22 comprises a ring through which shoulder straps 16 extends, allowing portion 22 and PASS 22 slide along portions of the length of shoulder straps 16 to further facilitate repositioning of appliance 12. Second portion 24 connects PASS 26 directly or indirectly to a portion of portable powered appliance 12. In one implementation, the second portion 24 comprises a ring for connection to a quick disconnect to facilitate easy coupling and decoupling of PASS 20 from appliance 12. In other implementations, the second portion 24 may be connected to powered appliance 12 in other fashions. In the example illustrated, second portion 24 is connected to powered appliance 12 between an engine/motor 27 of appliance 12 and a projecting bar or looped handle 28 of appliance 12. In other implementations, second portion 24 may be connected to other portions of appliance 12.

Stretcher 26 comprises that portion of PASS 20 that stretches. In one implementation, stretcher 26 is configured so as to not undergo stretching until experiencing a stretch triggering load at least 4.5 kg and no greater than 7 kg (approximately 15.4 pounds). In one implementation, the PASS is configured so as to not undergo stretching until experiencing a stretch triggering load of at least 4.5 kg (approximately 10 pounds) and no greater than 5 Kg (approximately 10 pounds). In another implementation, the PASS is configured so as to not undergo stretching until experiencing a stretch triggering load of at least 4.5 kg (approximately 10 pounds) and no greater than 5 kg (approximately 11 pounds). As a result, the PASS 20 may better transfer the weight of the powered appliance to the shoulders of the person carrying the portable powered appliance in the absence of intentional stretching of the PASS 20. Moreover, the PASS 20 is less likely to undergo inadvertent and/or excessive bouncing during use.

In one implementation, structure 26 consists of a homogenous, non-fibrous material. For example, in one implementation, stretcher 20 consists of a rubber or rubber-like material. In one implementation, stretcher 20 comprises a single homogenous unitary body of a rubber or rubber-like material. In one implementation, the stretcher may comprise multiple beams interconnected by a web of elastic material or elastic segments expand between the beams. In one implementation, the multiple beams and the web of elastic material may be a single unitary homogenous body of material, such as a rubber or rubber-like material. The multiple beams and web facilitate enhanced stretching performance while reducing the size and weight of PASS 20.

Figures 2, 3, 4, 5:
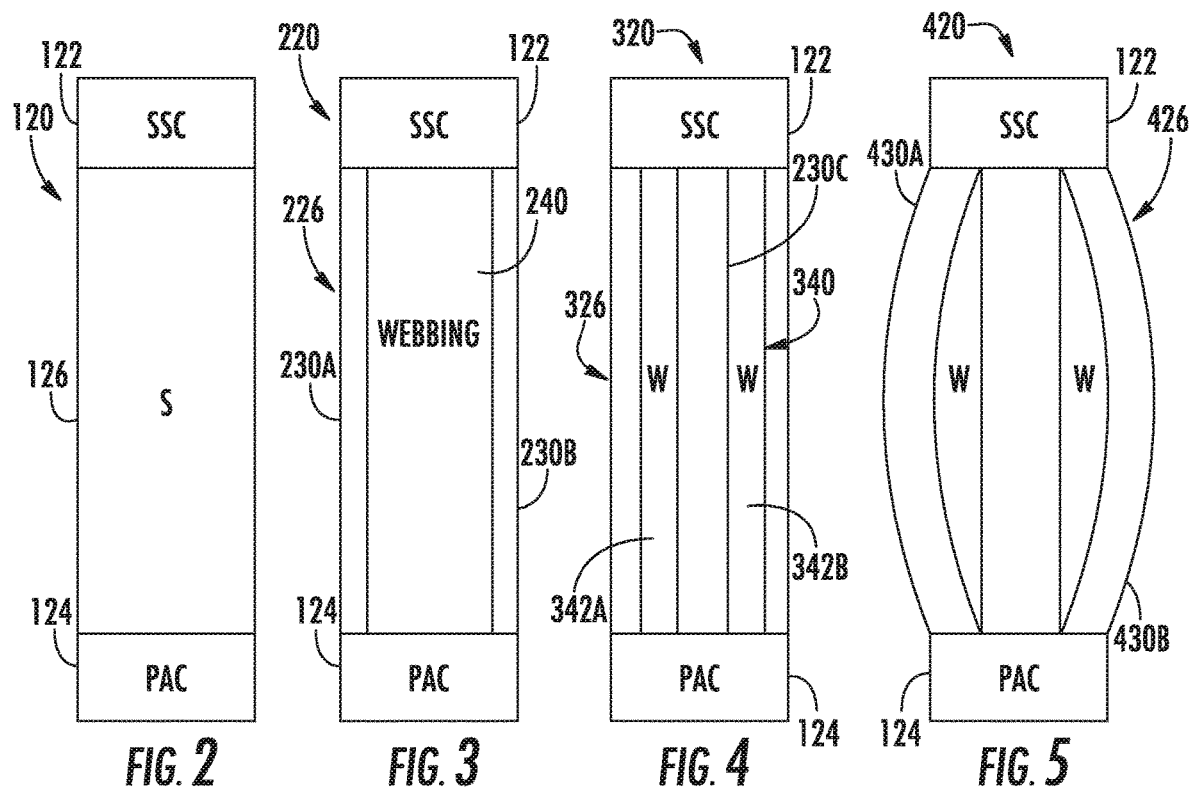
FIG. 2 is a schematic diagram of an example powered appliance support strap of the system of FIG. 1.
FIG. 3 is a schematic diagram of an example powered appliance support strap of the system of FIG. 1.
FIG. 4 is a schematic diagram of an example powered appliance support strap of the system of FIG. 1.
FIG. 5 is a schematic diagram of an example powered appliance support strap of the system of FIG. 1.
Figure 6:
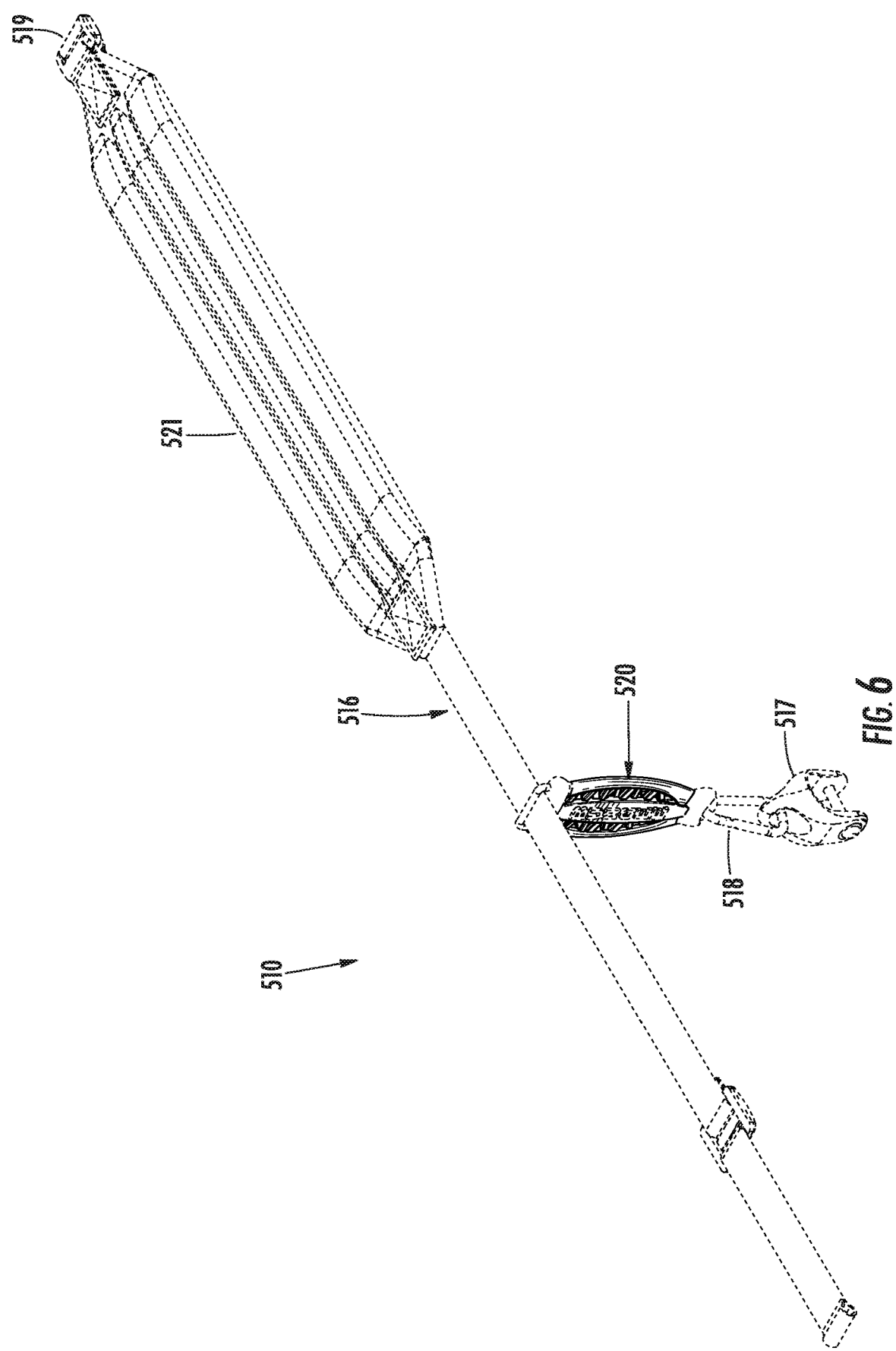
FIG. 6 is a perspective view one example of the powered appliance support system of FIG. 1.
Figure 7:
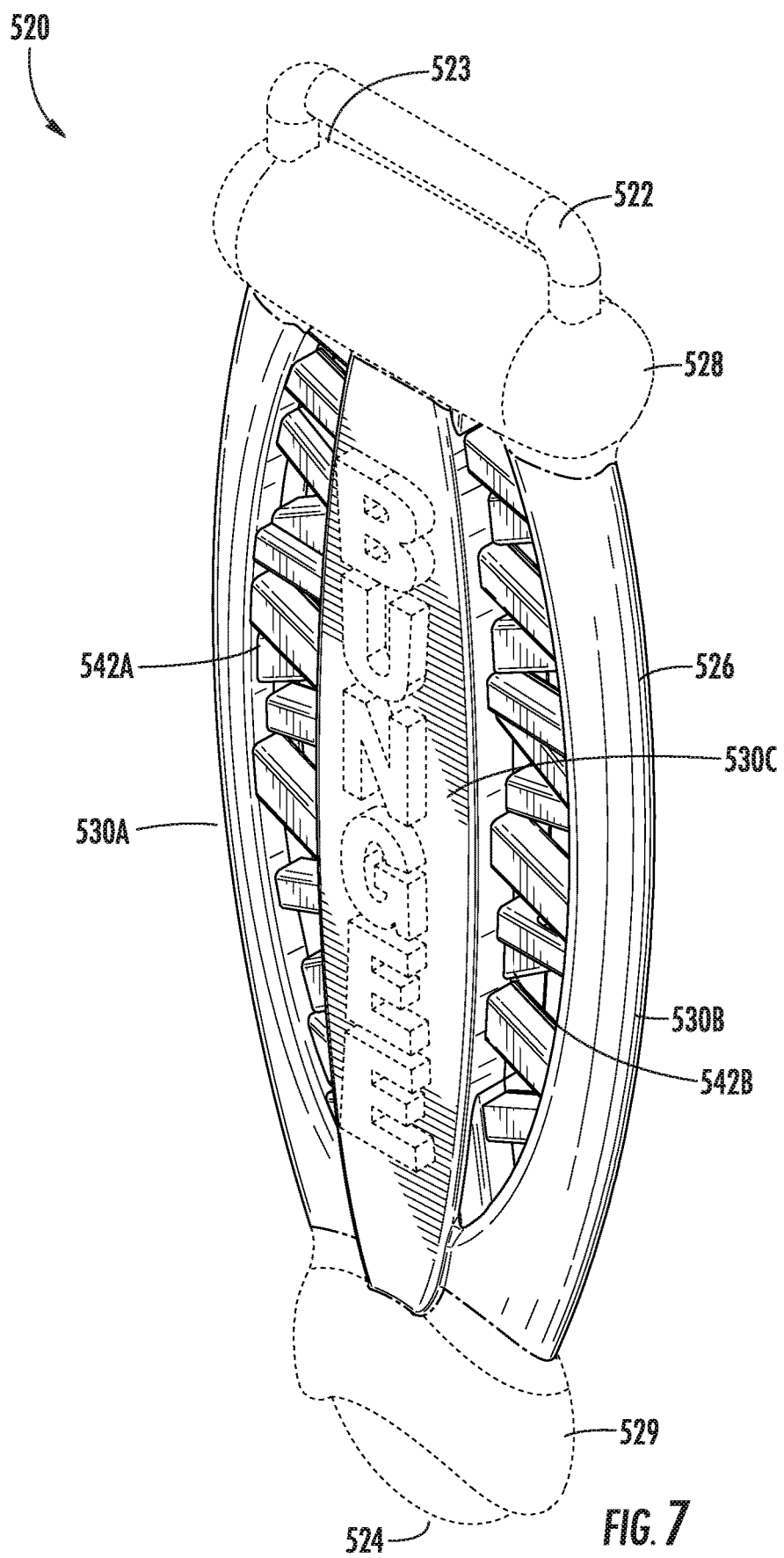
FIG. 7 is a front perspective view of an example powered appliance support strap of the system of Figure numeral six.
Figure 8:
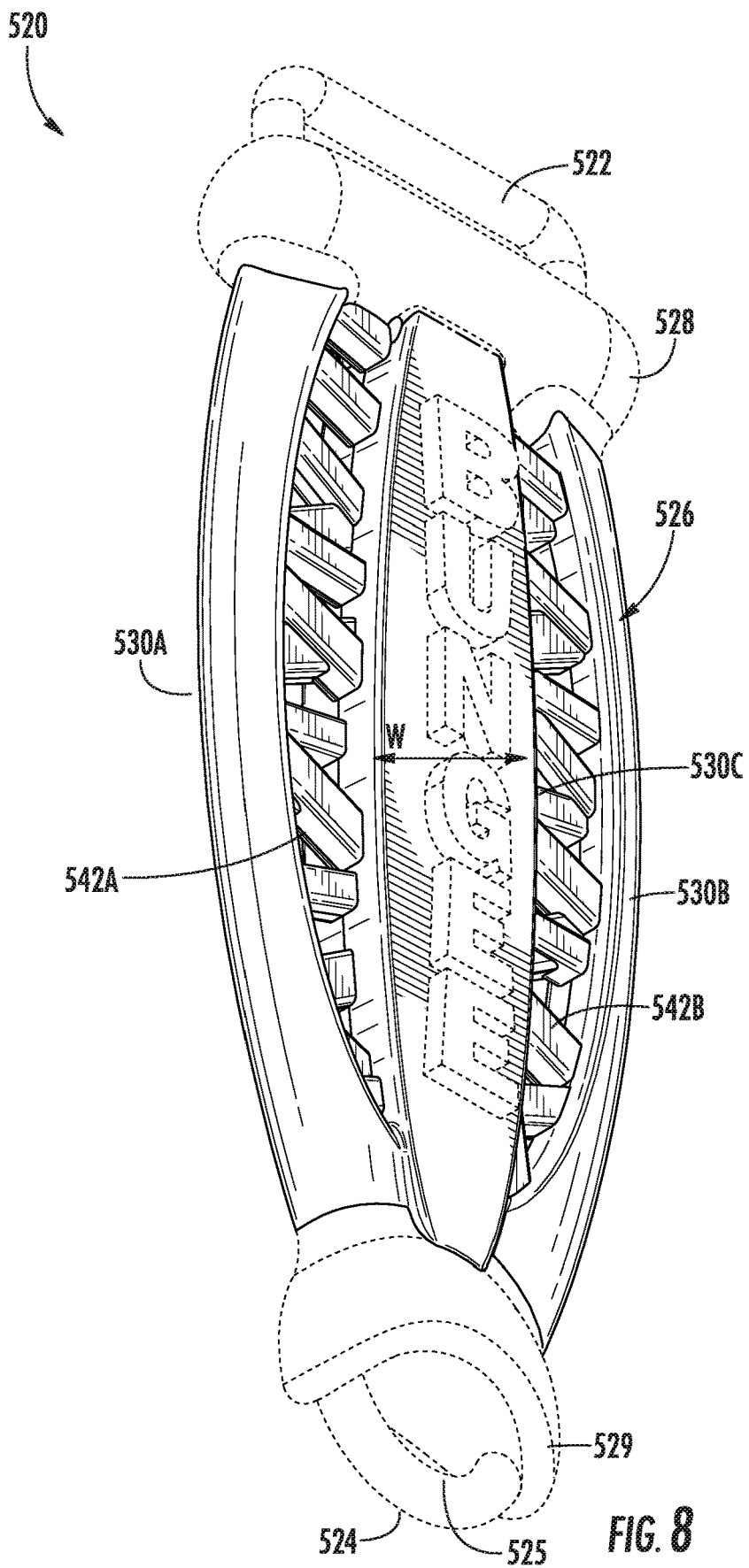
FIG. 8 is a bottom perspective view of the example powered appliance support strap of FIG. 7.
Figure 9:
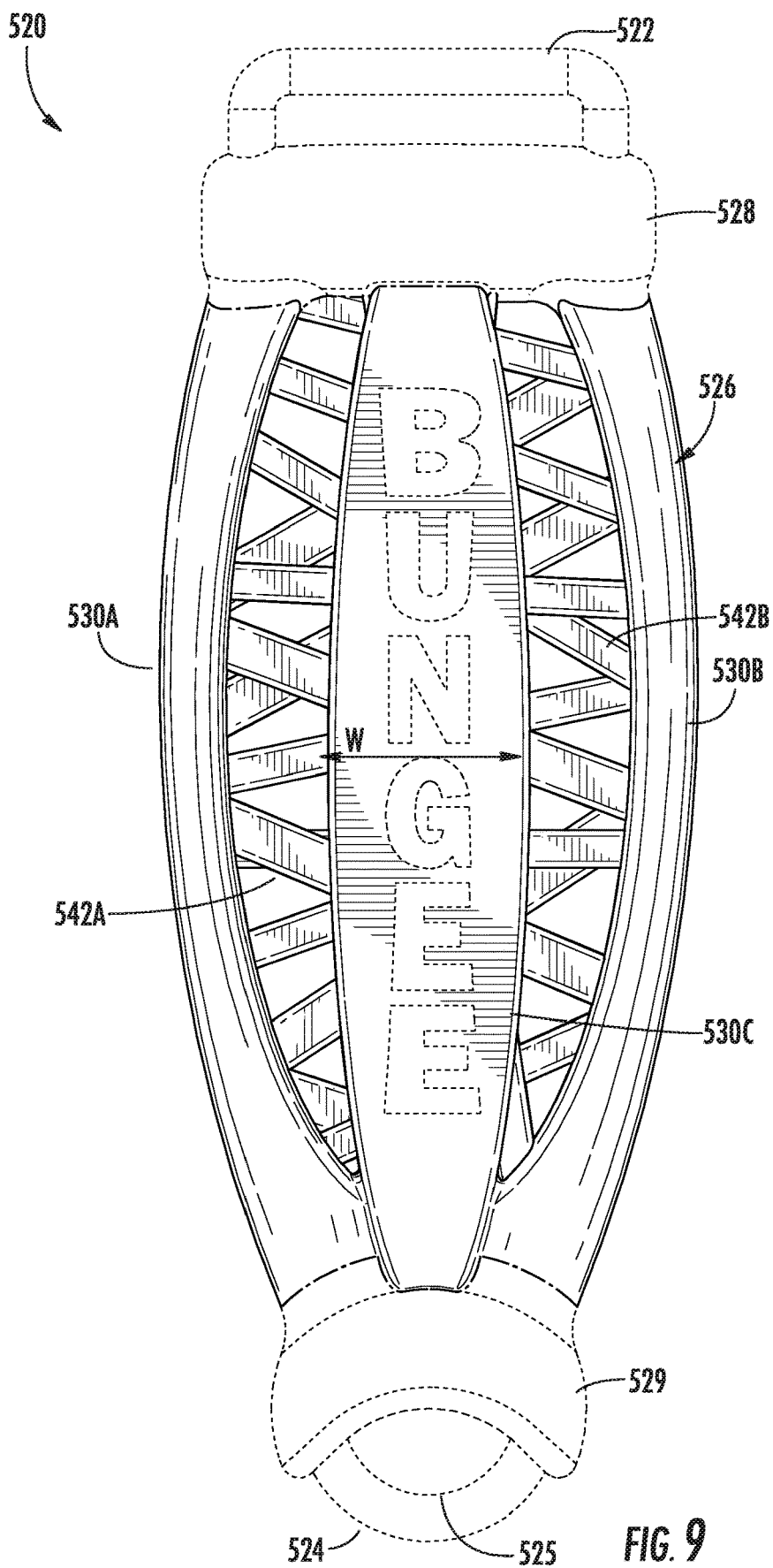
FIG. 9 is a front view of the powered appliance support strap of FIG. 7, the rear view of the powered appliance support strap being a mirror image of the front view.
Figure 10:
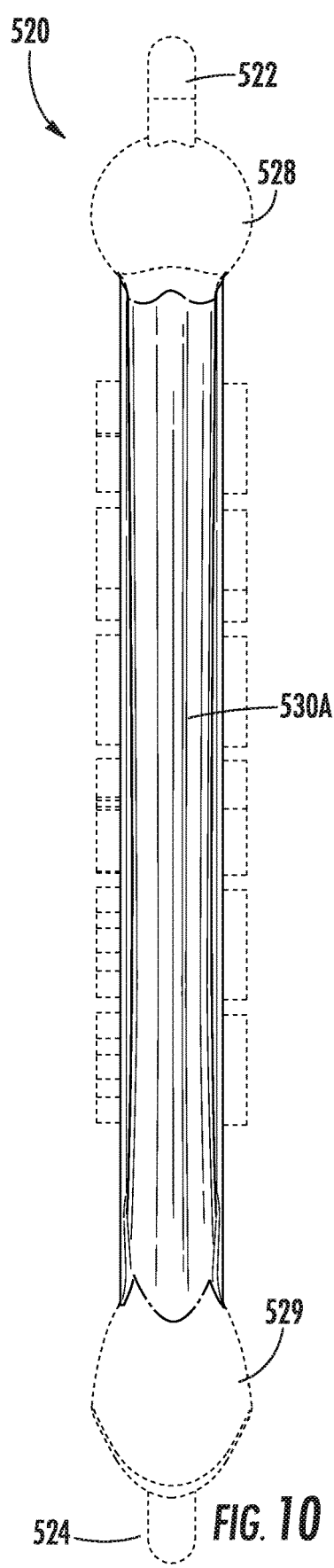
FIG. 10 is a left side view of the powered appliance support strap of FIG. 7.
Figure 11:
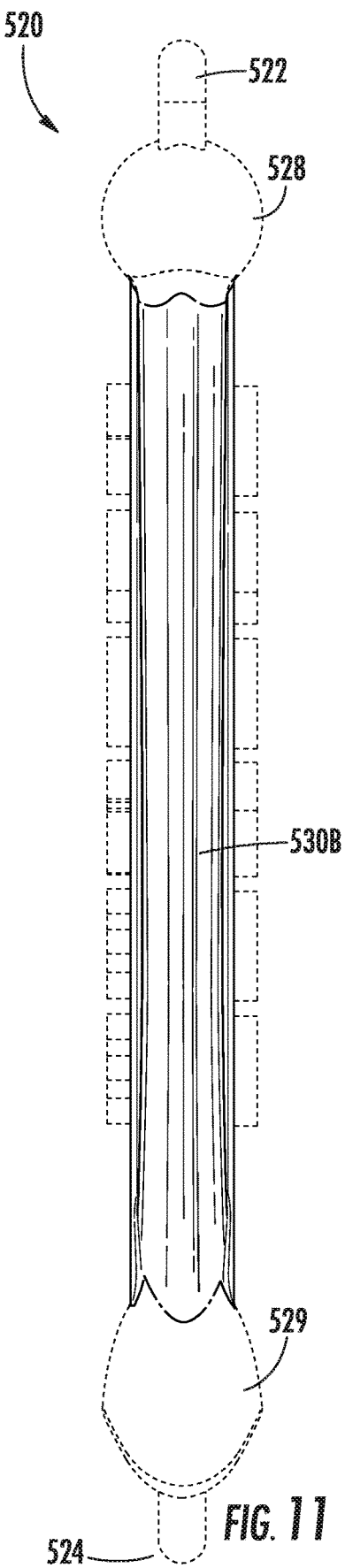
FIG. 11 is a right side view of the powered appliance support strap of FIG. 7.
Figure 12:
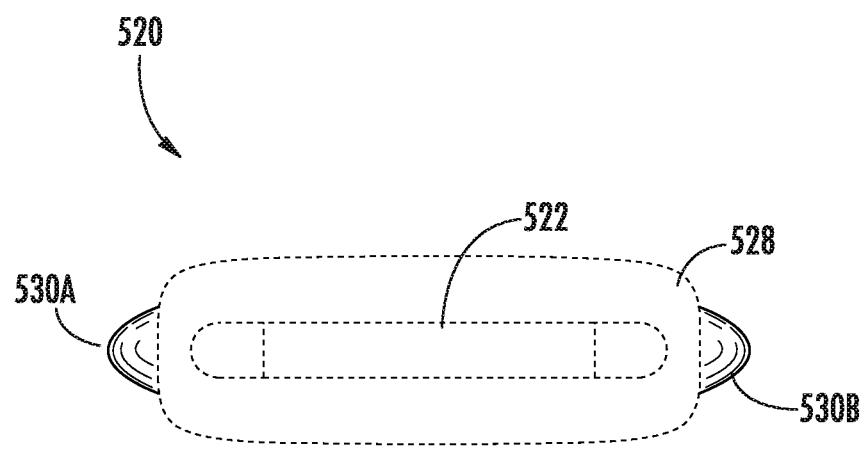
FIG. 12 is a top view of the powered appliance support strap of FIG. 7.
Figure 13:
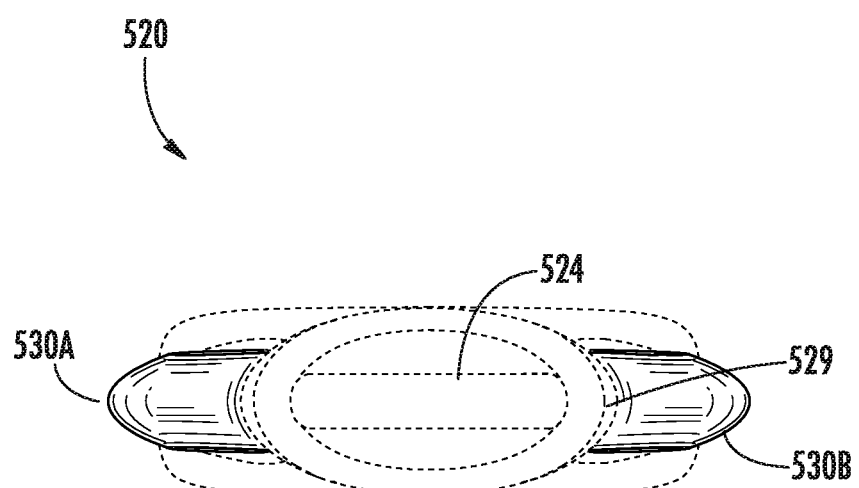
FIG. 13 is a bottom view of the powered appliance support strap of FIG. 7.

FIG. 2 schematically illustrates PASS 120, an example of PASS 20 that may be utilized as part of system 10. PATH 120 comprises shoulder strap connector portion 122, portable appliance connector portion 124 and stretcher portion 126. Shoulder strap connector portion 122 connects to shoulder strap 16. In one implementation, shoulder strap connector (SSC) portion 122 comprises a ring, loop or other structure that is slidable along portions of the length of shoulder straps 16 to facilitate repositioning of PASS 120. In one implementation, show strap connector portion 122 is slidable along a length of at least 6 inches and nominally of at least 12 inches along an axial length of shoulder straps 16.

Portable appliance connector (PAC) portion 124 connects a lower end of PASS 20 to a portable powered appliance, such as appliance 12 shown in FIG. 1. In one implementation, PAC portion 124 comprise a quick release connector. In other implementations, PAC may be fixedly connected or primly formed as part of the powered appliance.

Stretcher 126 extend between portions 122 and 124. Stretcher 126 is similar to stretcher 26 described above. Stretcher 26 is configured so as to not undergo stretching until experiencing a stretch triggering load at least 10 pounds and no greater than 15 pounds. As a result, the PASS 120 may better transfer the weight of the powered appliance to the shoulders of the person carrying the portable powered appliance in the absence of intentional stretching of the PASS 120. Moreover, the PASS 120 is less likely to undergo inadvertent and/or excessive bouncing during use.

FIG. 3 schematically illustrates PASS 220, an example of PASS 20 that may be utilized as part of system 10 described above. PASS 220 is similar to PASS 120 except that PASS 220 comprises stretcher 226 in place of stretcher 126. The remaining components of PASS 220 which correspond to components of PASS 120 are numbered similarly.

PASS 226 comprises beams 230A, 230B (collectively referred to as beams 230) and webbing 240 (schematically shown). Beams 230 extend between SSC 122 and PAC 124 on opposite sides of stretcher 226. Beams 230 are each formed from a resiliently stretchable material, such as a rubber or rubber-like material.

Webbing 240 comprises a web of material that spans between beams 230. Webbing 240 is resiliently stretchable. Webbing 240 cooperates with beams 230 to provide stretcher 226 with a resilient stretchability. In one implementation, webbing 240 and beams 230 provide stretcher 226 with a stretchability, wherein stretcher 226 does not undergo stretching until experiencing a stretch triggering load of at least 4.5 kg and no greater than 7 kg, anyone up limitation, no greater than 5 kg. For purposes of disclosure, "resilient" or "resiliently" or the rotors there from show mean that in the absence of an applied load, stretcher 226 or the individual component of stretcher 226 returns to its original unstretched size, shape and length.

In one implementation, webbing 240 and beams 230 are collectively resiliently stretchable so as to stretch, once the initial stretch threshold has been exceeded, by at least 0.6 and no greater than 0.9 cm in response to an applied load of 5 kg. In such an implementation, webbing 240 and beams 230 are collectively resiliently stretchable so as to stretch by at least 1.2 cm and no greater than 1.7 cm in response to an applied load of 7 kg. Further in such an implementation, webbing 240 and beams 230 are collectively resiliently stretchable for us to stretch by at least 2.7 cm and no greater than 2.11 cm in response to an applied load of 10 kg, once the initial stretch threshold has been exceeded. It has been found that such a resiliently stretchability for stretcher 226 provides enhanced support and shock absorption while avoiding excessive bouncing. In other implementations, stretcher 226 may have other elasticities.

In one implementation, webbing 240 comprises a series of crisscrossing elastic segments. In another implementation, webbing 240 comprises a weave of elastic segments. In another implementation, webbing 240 may comprise both parallel and oblique elastic segments. In one implementation, webbing 240 is integrally formed as a single unitary body with beams 230 from an elastomeric material, such as an elastomeric polymer, a rubber or rubber-like material. In another implementation, webbing 240 may comprise resilient elastic segments or strands that are separate from beams 230 but which are connected to beams 230. For example, webbing 240 may comprise resilient elastic segments or strands having ends captured and embedded within beams 230. In another implementation, webbing 240 may comprise resilient elastic segments or strands, bonded or welded to beams 230. In another implementation, webbing 240 may comprise resilient elastic segments or strands repeatedly or continuously wrapping about each of beams 230, wherein beams 230 form supporting sides of the overall webbing 240.

In one implementation, webbing 240 and beams 230 a form from the same elastomeric material. In another implementation, webbing 240 may have a different material structure as compared to beams 230. For example, in one implementation, beams 230 may be formed from a resiliently stretchable rubber or rubber-like material while webbing 240 comprises a resiliently stretchable webbing of elastomeric strands covered or encapsulated by a fabric or a resiliently stretchable fabric.

FIG. 4 schematically illustrates PASS 320 an example of PASS 20 that may be utilized as part of system 10 described above. PASS 320 is similar to PASS 220 except that PASS 220 comprises stretcher 326 in place of stretcher 226. Stretcher 326 is similar to stretcher 226 except that stretcher 326 comprises an additional beam 230C and comprises webbing 340 in place of webbing 240. The remaining components of PASS 320 which correspond to components of PASS 120 and 220 are numbered similarly.

Beam 230C is similar to beams 230A and 230B. With respect to those implementations having greater than two beams, each of the beams may be collectively referred to as beams 230. Beam 230C extends between and spans between SSC 122 and PAC 124, between beams 230A and 230B. Beam 230C is transversely spaced from each of beams 230A, 230B. In the example illustrated, beam 230C is thicker and/or wider than corresponding portions of beams 230A, 230B. Beam 230C provides enhanced strength and durability to stretcher 326.

In one implementation, beam 230C is formed from the same material as that of beams 230A and 230B. In one implementation, beam 230C integrally formed as a single unitary body with beams 230A, 230B from a resiliently stretchable material, such as a rubber or rubber-like material. In one implementation, beam 230C. In one implementation, beam 230C is integrally formed as a single unitary body from a single homogenous resiliently stretchable material with beams 230A, 230B and webbing 340.

Webbing 340 is similar to webbing 240 described above except that webbing 340 comprises two separate spaced webbing portions or webs 342A, 342B (collectively referred to as webs 342). Webs 342 are each resiliently stretchable. Each of webs 342 may have a composition or structure similar to the individual webbing 340 described above. Web 342A spans between and interconnects beams 230A and 230C. Web 342B spans between and interconnects beams 230B and 230C.

Webbing 340 cooperates with beams 230 to provide stretcher 326 with a resilient stretchability. In one implementation, webbing 340 and beams 230 provide stretcher 326 with a stretchability, wherein stretcher 226 does not undergo stretching until experiencing a stretch triggering load of at least 1 kg and no greater than 7 kg and, in one implementation, no greater than 5 kg. In one implementation, webbing 340 and beams 230 are collectively resiliently stretchable so as to stretch by at least 0.6 and no greater than 0.9 cm in response to an applied load of 5 kg after the stretch threshold has been satisfied. In such an implementation, webbing 340 and beams 230 are collectively resiliently stretchable so as to stretch by at least 1.2 cm and no greater than 1.7 cm in response to an applied load of 7 kg. Further in such an implementation, webbing 340 and beams 230 are collectively resiliently stretchable for us to stretch by at least 2.7 cm and no greater than 2.11 cm in response to an applied load of 10 kg. It has been found that such a resiliently stretchability for stretcher 226 provides enhanced support and shock absorption while avoiding excessive bouncing. In other implementations, stretcher 326 may have other elasticities.

FIG. 5 schematically illustrates PASS 420 an example of PASS 20 that may be utilized as part of system 10 described above. PASS 420 is similar to PASS 320 except that PASS 420 comprises stretcher 426 in place of stretcher 326. Stretcher 426 is similar to stretcher 326 except that stretcher 426 comprises beams 430A and 430B (collectively referred to as beams 430) in place of beams 230A and 230B, respectively. The remaining components of PASS 420 which correspond to components of PASS 220, 120 and 220 are numbered similarly.

Beams 430A, 430B are each similar to beams 230A, 230B as described above except that beams 430 outwardly bow or curve away from beam 230C. beams 430 are connected to beam 230C by webs 342A, 342B (described above). In the example in FIG. 5, webbing 342 each have a slightly different to accommodate the outward bowing of beams 430. The outward bowing of beams 430 enhances the control stretching performance of stretcher 426. During such stretching, beams 430 moved towards a straightened state, a state in which beams 430 are parallel with beam 230C. the bowed nature of beams 430 results in beam 430 initially straightening in response to an applied load. During such time, the linear shape of being 230C (perpendicular between or with respect to portions 122 and 124) results in the material of beam 230C resiliently stretching in response to an applied load straightening beam 230C prior to the resilient stretching of beams 430.

Webbing 340 cooperates with beams 430, 230 to provide stretcher 426 with a resilient stretchability. In one implementation, webbing 340 and beams 430, 230 provide stretcher 426 with a stretchability, wherein stretcher 426 does not undergo stretching until experiencing a stretch triggering load of at least 1 kg and no greater than 7 kg and, in one implementation, no greater than 5 kg. In one implementation, webbing 440 and beams 430, 230 are collectively resiliently stretchable so as to stretch by at least 0.6 and no greater than 0.9 cm in response to an applied load of 5 kg. In such an implementation, webbing 340 and beams 430, 230 are collectively resiliently stretchable so as to stretch by at least 1.2 cm and no greater than 1.7 cm in response to an applied load of 7 kg. Further in such an implementation, webbing 340 and beams 430, 230 are collectively resiliently stretchable for us to stretch by at least 2.7 cm and no greater than 2.11 cm in response to an applied load of 10 kg. It has been found that such a resiliently stretchability for stretcher 426 provides enhanced support and shock absorption while avoiding excessive bouncing. In other implementations, stretcher 426 may have other elasticities.

FIGS. 6-13 illustrate portions of an example portable appliance system 510. Similar to system 10, system 510 is configured to support an example powered appliance 12 (shown in FIG. 1) from the shoulders of a user 14 (shown in 1). System 510 comprises shoulder strap 516, powered appliance coupler 517, quick disconnect 518 and powered appliance support strap (PASS) 520 (schematically illustrated). Strap 516 is in the form of a continuous loop that wraps over one shoulder and beneath an opposite shoulder of user 14. In the example illustrated, strap 516 has two ends which are releasably connected to one another. In one implementation, strap 516 has two ends which are releasably connected to one another via a buckle arrangement 519 to provide strap 516 with an adjustable length. In one implementation, shoulder strap 516 may additionally comprise padding 521.

Powered appliance coupler 517 comprises a connector that releasably connects to a shaft or other portion of the portable powered appliance, such as appliance 12 shown in FIG. 1. Powered appliance coupler 517 facilitates use of system 510 on pre-existing portable powered appliances. Powered appliance coupler 517 facilitates connection of PASS 520 to the powered appliance using quick disconnect 518. Quick disconnect 518 comprises a quick disconnect device, such as a carabiner, hook or other similar connection mechanism connected to PASS 520 and releasably connected to or passing through a ring, loop, hook or other connection portion of coupler 517.

PASS 520 is shown in more detail in FIGS. 7-13. PASS 520 comprises shoulder strap connector portion 522, powered appliance connector portion 524 and stretcher 526. Portions 522 and 524 each comprise rings through which or by which PASS 520 may be connected to shoulder strap 516 and the powered appliance 12 (shown in FIG. 1). Portion 52 comprises a flat bar or ring forming a rectangular opening 523 through which a generally flat strap of shoulder strap 516 may extend and slide. Portion 124 comprises a more circular or curved ring having an opening 5254 being connected to quick disconnect 518. In the example illustrated, each of portions 522 and 524 are partially embedded into the single continuous integral unitary body forming stretcher 526. In one implementation, the metallic rings forming portions 522 and 524 are molded into the material forming stretcher 526. In yet other implementations, the rings forming portions 522 and 524 are passed through the body of material forming stretcher 526.

Stretcher 526 extends between portions 522 and 524. Stretcher 526 comprises end caps 528, 529, beams 530A, 530B, 530C (collectively referred to as beams 530) and webs 542A, 542B (collectively referred to as webs 542). End caps 528, 529 extend along opposite ends of stretcher 526. End cap 528 spans across and connects each of beams 530. End cap 529 also stands across and connects each of beams 530. As noted above, in the example illustrated, end caps 528, 529 are molded about portions of the rings that form connector portion 522 and 524, respectively. End caps 528, 529 are part of a single integral unitary body with each of beams 530 and each of webs 542. The example illustrated, due to the embedded metallic rings within and 52A, 529, and 52A, 529 and a greater rigidity and stiffness and are generally not resiliently stretchable as compared to beams 530 and webs 542 which do not encapsulate or include internally embedded stiffening structures.

In other implementations, end caps 528, 529 may be formed from material different than the materials forming beams 530 and webs 542. For example, in other implementations, end caps 528, 529 may be formed from a more rigid or stiffer polymer which is co-molded with the resiliently stretchable rubber or rubber-like material forming beams 530 and webs 542. In still other implementations, end caps 528, 529 may be formed from a first rigid metal or polymer material that encapsulates or surrounds the rings forming portions 522, 524, wherein the resiliently stretchable rubber or rubber-like material forming the integral and unitary structure providing beams 530 and webs 542 is over molded about end caps 528, 529 and/or through apertures passing through the rigid metal or polymer material forming end caps 528, 529.

Beams 530A and 530B (collectively referred to as side beams 530) are transversely spaced from one another in extend along opposite sides of stretcher 526 of PASS 520. Side beams 530 extends between and 528, 529. Each of side beams 530 outwardly bows away from beam 530C, providing stretcher 526 and PASS 520 with a substantially flat oval shape.

Beam 530C forms a center beam or spine for stretcher 526 and PASS 520. Beam 530C generally extends perpendicular to the transverse axes of end caps 528, 529 from end cap 528 to end cap 529. Beam 530C has a width greater than the width of side the individual beams 530. In the example illustrated, beam 530C has an elongated oval shape, being wider at a midpoint and narrower in those regions proximate to end caps 528, 529.

The shape of beams 530 accommodates the elongation or stretching of stretcher 526. During initial stretching, the oval or bowed shape of side beams 530 allow side beams 530 straighten while undergoing a lesser degree of resilience stretching as compared to beam 530C. the oval shape of beam 530C, being wider at the center narrower at the end portions, accommodates the resilience stretching of beam 530C, where the center portion of beam 530C undergoes greater stretch and thinning in response to tensile forces as compared to the end portions of beam 530C. The non-uniform width W (shown in FIG. 9) facilitates resilience stretching of being 530C and prolonging such stretchability prior to failure of beam 530C.

Webs 542 span between beams 530. Web 542A spans between beams 530A and 530C. Web 542B spans between beams 530B and 530C. Each of webs 542 may have a configuration similar to that described above with respect to webbing 240 or webs 342. As noted above, webs 542 facilitates resilience stretching by connecting beams 530 or reducing the mass and weight of stretcher 526 and that of PASS 520. As explained above, webs 520 may have a variety of different sizes, shapes and configurations as well as a variety of different patterns or arrangements.

Figure 14:
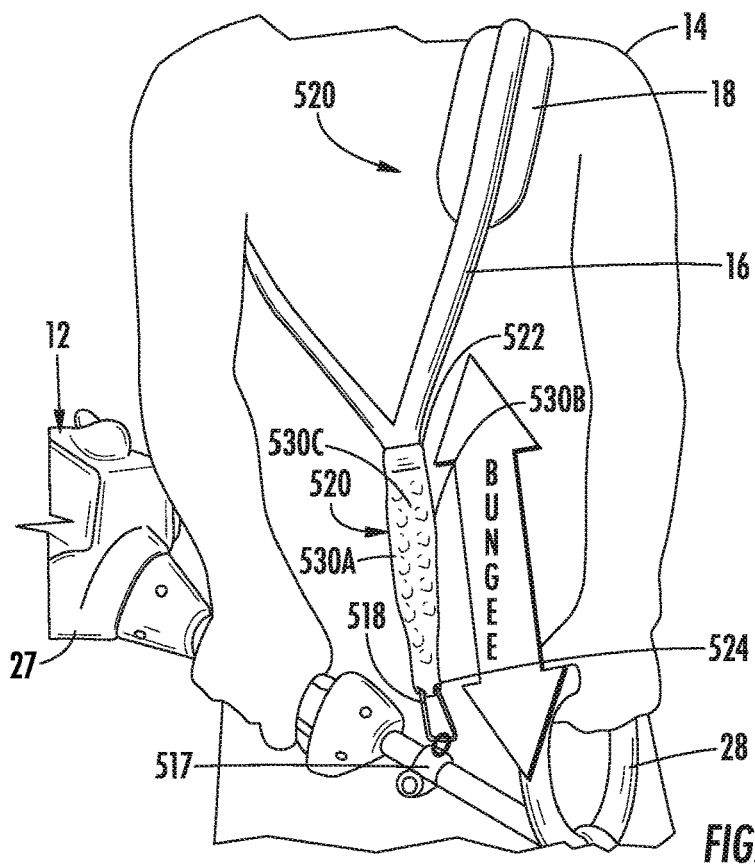
FIG. 14 is a front perspective view of the example powered appliance support system of FIG. 6 illustrating stretching of the example powered appliance support strap while being worn by a person to assist in carrying an example powered appliance.
Figure 15:
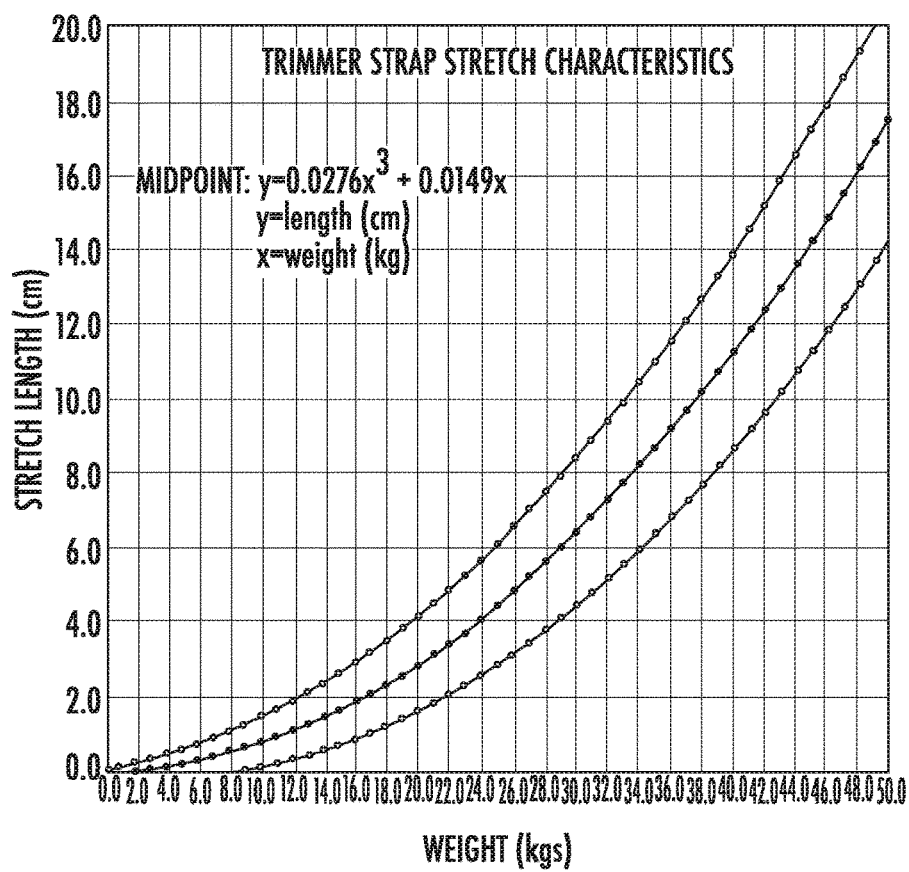
FIG. 15 is a graph illustrating an example stretch profile for the powered appliance support strap of FIGS. 6-14.

FIGS. 14 and 15 illustrate stretching of PASS 520 during use. As shown by FIG. 14, stretcher 526 absorbs a weight and release body tension while stabilizing the powered appliance for enhanced control. As shown by FIG. 14, during such elongation, sidewalls 530 move inward towards spine 530C. At the same time, PASS 520 is permitted to slide along shoulder strap 16 to center the load upon the user shoulders.

FIG. 15 illustrates an example stretch profile for the example PASS 520. In the graph illustrated in FIG. 5, the center curve represents the average or nominal stretch profile while the uppermost and lowermost curves represent variations or tolerances for the average or nominal stretch profile. In the example illustrated, PASS 520 does not start to stretch until a weight or load of 1.13 kg (roughly 2.5 pounds) is exerted upon 520. One stretching has begun, stretching occurs at a midpoint of PASS 520 pursuant to the depicted mathematical expression $y=0.0276x^2+0.0149x$, where y is the ltnght(in cm) of PASS 520 and where x is the applied weight or load (in kilograms). In the example illustrated, the stretching of PASS 520 has a variability of +/−13% of the applied weight. In other implementations, PASS 520 may delay stretching and begin to stretch at other triggering weight thresholds. In other implementations, once the stretch threshold has been exceeded, PASS 520 may stretch in accordance with other mathematical expressions or formulas.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A powered appliance support strap comprising:
    a first portion to extend from a continuous loop of a shoulder strap;
    a second portion to extend from a powered appliance to be manually carried by a person wearing the shoulder strap; and
    a stretcher extending between the first portion and the second portion,
        wherein the stretcher has an unstretched length of no greater than 15 cm,
        wherein the stretcher is stretchable to a stretched length that is 10 cm greater than the unstretched length,
        wherein the stretcher does not undergo stretching until experiencing a stretch triggering load at least 1 kg and no greater than 7 kg; and
        wherein the stretcher comprises a single body comprising:
            a first beam extending between the first portion and the second portion;
            a second beam spaced from the first beam, the second beam extending between the first portion and the second portion; and
            a web of elastic segments spanning between the first beam and the second beam.

2. The powered appliance support strap of claim 1, wherein the stretcher consists of a homogenous, non-fibrous material.

3. The powered appliance support strap of claim 1, wherein the stretcher consists of a rubber or elastomeric polymer.

4. The powered appliance support strap of claim 1 further comprising:
    a third beam extending between the first portion and the second portion, the third beam extending on an opposite side of the first beam as the second beam; and
    a second web of elastic segments spanning between the first beam and the third beam.

5. The powered appliance support strap of claim 4, wherein the first beam has a first thickness, wherein the second beam has a second thickness less than the first thickness and wherein the third beam has a third thickness less than the first thickness.

6. The powered appliance support strap of claim 5, wherein the elastic segments of the web and the elastic segments of the second web have a maximum thickness less than the first thickness.

7. The powered appliance support strap of claim 1, wherein the stretcher has a Young's modulus of between 1 MPa and 4 MPa.

8. The powered appliance support strap of claim 1, wherein the first portion comprises a loop to receive the shoulder strap and slide along the shoulder strap.

9. The powered appliance support strap of claim 1, wherein the stretcher has a first width adjacent the first portion, a second width adjacent the second portion and a middle portion having a third width greater than the first width and the second width.

10. A powered appliance support strap comprising:
    a first portion to be coupled to a continuous loop of a shoulder strap;
    a second portion to be coupled to a powered appliance to be manually carried by a person wearing the shoulder strap; and
    a single integral unitary body extending between the first portion and the second portion, the body comprising:
    a first resiliently flexible beam extending between the first portion and the second portion;
    a second resiliently flexible beam spaced from the first beam extending between the first portion and the second portion; and
    a web of elastic segments spanning between the first resiliently flexible beam and the second resiliently flexible beam, wherein the elastic segments are separated by openings through the stretcher and angularly extend between the first resiliently flexible beam and the second resiliently flexible beam in directions oblique to the first resiliently flexible beam and the second resiliently flexible beam,
    wherein the single integral unitary body is formed from a rubber or elastomeric polymer, wherein the body further comprises:
        a third beam extending between the first portion and the second portion, the third beam extending on an opposite side of the first beam as the second beam; and
        a second web of elastic segments spanning between the first beam and the third beam, wherein the first beam has a first thickness, wherein the second beam has a second thickness less than the first thickness and wherein the third beam has a third thickness less than the first thickness.

11. The powered appliance support strap of claim 10, wherein the elastic segments of the web and the elastic segments of the second web have a maximum thickness less than the first thickness.

12. The powered appliance support strap of claim 10, wherein the single integral unitary body has a first width adjacent the first portion, a second width adjacent the second portion and a middle portion having a third width greater than the first width and greater than the second width.

13. The powered appliance support strap of claim 10, wherein the first portion comprises a loop to receive the shoulder strap and slide along the shoulder strap.

14. The powered appliance support strap of claim 10, wherein the single integral unitary body has a flat oval shape.

15. The powered appliance support strap of claim 10, wherein the single integral unitary body has a length of at least 9 cm and no greater than 15 cm.

\* \* \* \* \*